No. 807,978. PATENTED DEC. 19, 1905.
J. S. WALCH.
GRAIN SEPARATOR.
APPLICATION FILED JUNE 26, 1905.

Witnesses.

Inventor:
Jacob S. Walch
Geo. H. Strong. Atty

UNITED STATES PATENT OFFICE.

JACOB S. WALCH, OF ROSELAWN, CALIFORNIA.

GRAIN-SEPARATOR.

No. 807,978. Specification of Letters Patent. Patented Dec. 19, 1905.

Application filed June 26, 1905. Serial No. 266,950.

*To all whom it may concern:*

Be it known that I, JACOB S. WALCH, a citizen of the United States, residing at Roselawn, in the county of Siskiyou and State of California, have invented new and useful Improvements in Grain-Separators, of which the following is a specification.

My invention relates to means for separating grain from straw and associate impurities after the grain has been threshed.

It consists in the combination of mechanism and in details of construction, which will be more fully explained by reference to the accompanying drawings, in which—

Figure 1:
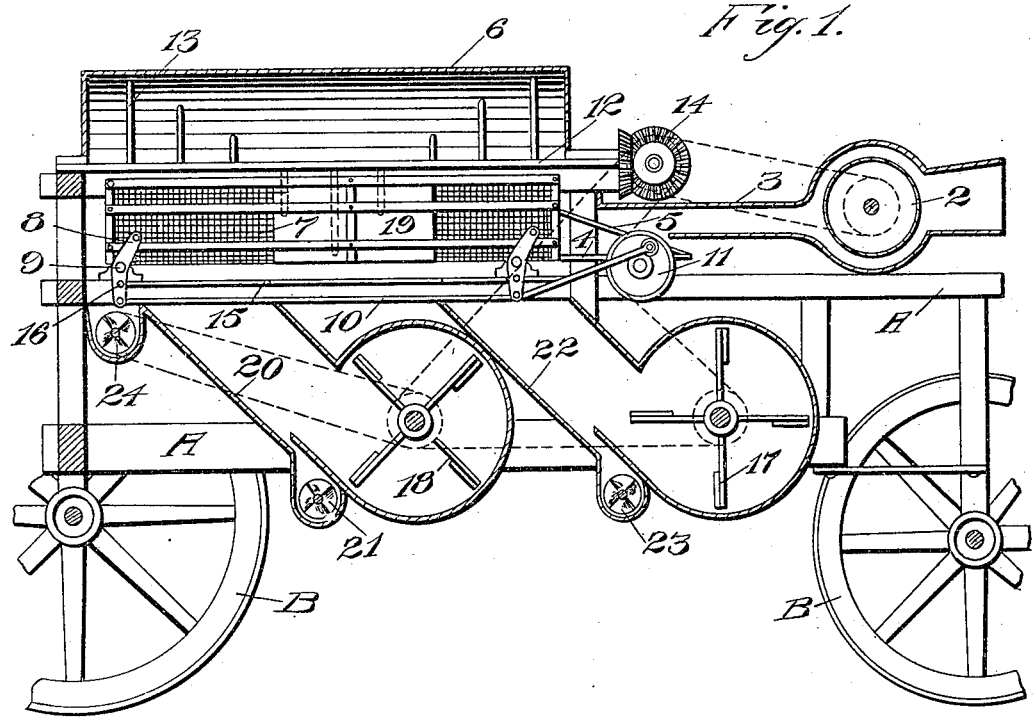
Figure 2:
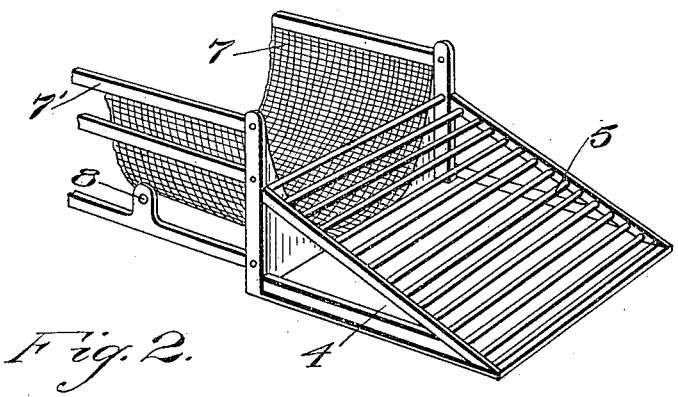

Figure 1 is a side elevation and partial section of my apparatus. Fig. 2 is a perspective view of the lower portion of the cylindrical shaking-screen in part.

It is the object of my invention to provide an apparatus for the rapid and effective cleaning of threshed grain. Such apparatus may be either employed separately as a grain-cleaner or in conjunction with a threshing apparatus, or it may be mounted so as to be used in conjunction with a continuous reaping, threshing, and sacking apparatus in the form known as "combined harvester."

In the present case I have shown the threshing and cleaning mechanism only. This mechanism consists of a suitable frame, as at A, mounted upon bearing-wheels B and having a threshing-cylinder 2, between which and the concave 3 the straw is delivered by any suitable or well-known feeding mechanism. (Not here shown.) From the cylinder the grain and straw are delivered to a carrier which consists of a closed bottom 4 and an inclined open slat frame suitably located above the bottom, as at 5. In passing over this frame the straw is lifted, and a great portion of the grain falls upon the bottom 4, and both straw and grain are delivered into the cleaning-cylinder. This cylinder has a closed segmental top, as at 6, and a lower semicircular screen-bottom 7. This cylindrical structure and the carrier are suitably mounted upon a frame, as at 7', and this frame is suspended upon the upper ends of rocker-arms, as at 8. These arms are fulcrumed to a fixed frame, as at 9, and the lower ends of the rocker-arms are connected by a pitman 10 with an eccentric or equivalent crank or cam mechanism 11, by which the rocker-arms are oscillated about their fulcrum-points and the supported cylindrical screen is oscillated in the direction of its length.

Through the center of the cylindrical screen extends a shaft 12, having fixed upon it radial arms or blades, as at 13, which arms or blades are preferably disposed so as to form a spiral from one end to the other within the screen. This shaft is driven, by means of gearing 14, from any suitable source of power. If the machine is a stationary thresher only, power will be supplied by a suitable motor. If it is a traveling machine, either a motor may be employed or power may be derived from the rotation of the wheels by means of belts or chains.

In the present case I have only shown the belts by which the cylinder and the various other parts of the machine are driven. By the rotation of the arms 13 within the screen-cylinder and the longitudinal oscillation of this screen 7 the grain is separated from the straw and is caused to pass through the lower screen-half 7 of the cylinder. Beneath this cylindrical screen is a horizontal flat screen 15, extending substantially the whole length of the cylinder, and this flat screen is connected with the rocker-arms 8 at the points 16 below the fulcrum 9 of the rocker-arms. Thus the motion is transmitted to oscillate the rocker-arms and move the cylindrical screen in one direction and acts to operate the flat screens in the opposite direction. It will, however, be manifest that other equivalent dispositions of the screens may be made without altering the character of the device or its operation.

Beneath the screens are located fans 17 18. The discharge of the fan nearest the front is delivered through the front end of the screen 15 and also into the front portion of the semicylindrical screen 7, which projects sufficiently beyond the screen 15 for that purpose. The blast from the fan 18 is in like manner delivered through the rear portion of the screens 7 and 15. In order to prevent any grain from falling upon the casing of the fan 18, I have shown that portion of the screen 15 which lies above this casing as being closed, as at 19, so that when the grain reaches this closed portion it will pass over it and not fall through at undesirable points. After passing the closed portion the grain will again pass over the rear portion of the screen and a further separation may take place.

The front portion of the screen 15 may allow the grain to fall through, and passing down the incline 20 the grain will be delivered into a transverse spout having the usual carrying-auger 21, by which it will be delivered at one side of the machine. In like manner the rear portion of the screen 15 may allow the grain to pass through, and being directed by the inclined side 22 it will be in like manner delivered into a spout with an auger, as at 23. Any unthreshed heads or valuable material which it is desired to save may be received into a spout with carrying-auger, as at 24, and from this spout may be returned to the threshing-cylinder or otherwise disposed of.

Having thus described my invention, what I claim, and desire to secure by Letters Patent, is—

1. In an apparatus for threshing and cleaning grain, a screen comprising a semicylindrical foraminous lower portion, a closed upper portion, a carrier attached to the receiving end comprising a closed bottom and an upwardly-inclined open slat frame located above the bottom, and a threshing-cylinder from which the grain and straw will deliver upon said frame and bottom.

2. In an apparatus for threshing and cleaning grain, a cylinder having an upper closed portion, a lower foraminous or screen portion, means positioned at the inlet end of the screen and including an inclined screen-surface forming a conductor for the threshed straw and grain, for delivering threshed grain and straw into one end of the cylinder, a longitudinal, central revoluble shaft having beater-arms within the screen-cylinder, and means for rotating said shaft.

3. In an apparatus for threshing and cleaning grain, a cylinder having a closed upper half and a foraminous or screen lower half, a preliminary grain and straw separating device, consisting of a substantially horizontal closed bottom and an upwardly-inclined open slat frame attached to the screen-cylinder, rocker-arms from which the structure is suspended and through which a longitudinal oscillation of the screen is effected, and a threshing-cylinder from which the grain and straw are delivered to the separator and cylinder.

4. In a grain threshing and cleaning apparatus, a cylinder having a closed upper half and a foraminous or screen bottom, rocker-arms upon which the cylinder is suspended, means for oscillating it in the direction of its length, a journaled revoluble shaft extending horizontally through the cylinder and having radially-disposed beater-arms, a threshing-cylinder and means for delivering the straw and grain into the screen-cylinder, said last-named means including a closed bottom and an inclined screen-surface forming separate conductors for the threshed straw and grain.

5. In an apparatus for cleaning grain, a cylinder having a closed upper half, a lower foraminous or screen segment, rocker-arms upon which the cylinder is suspended, means for producing a longitudinal reciprocation thereof, a revoluble longitudinally-journaled shaft with beater-arms located within the screen-cylinder, a second screen located below the cylindrical screen and connections by which said screen is oscillated longitudinally.

6. In an apparatus for cleaning grain, a cylinder having a closed upper half and a longitudinally-oscillating foraminous or screen bottom, means for delivering threshed straw and grain into one end of the cylinder, a revoluble central journaled shaft and beaters within the cylinder, a second screen located below the segmental screen, means by which it is longitudinally oscillated, fans by which blasts of air are delivered through the front and rear portions of the screens, and means for collecting and transferring the material passing through the screens.

7. In an apparatus for cleaning grain, a cylinder having a closed upper half and a screen-bottom, a shaft with beater-arms revoluble within the cylinder, a second screen located below the first-named screen and receiving material therefrom, fulcrumed rocker-arms, means by which the upper screen is suspended from the upper ends of the arms and the lower screen below the fulcrums, and means by which the rocker-arms are oscillated.

8. In an apparatus for cleaning grain, a cylinder having a closed upper half and a screen-bottom, a second screen located below the first, rocker-arms upon which the two screens are suspended, means for oscillating the rocker-arms and the screens, a shaft with beaters revoluble within the cylindrical screen, fans with discharge-mouths delivering air through the front and rear portions of said screens, and closed bottom in the screen located above the rear fan-case.

9. In an apparatus for cleaning grain, a semicylindrical screen having a closed upper portion and a screen-bottom, a second screen located below the first-named screen, rocker-arms upon the upper ends of which the upper screen is suspended and from the lower ends of which the lower screen is suspended, means connected with said arms by which they are oscillated, fans with discharge-passages delivering air respectively through the front and rear ends of the screens, inclined chutes connecting with each of the screens, spouts into which the inclined chutes discharge and a transmitting-auger revoluble in said spouts.

In testimony whereof I have hereunto set my hand in presence of two subscribing witnesses.

JACOB S. WALCH.

Witnesses:
G. H. CHAMBERS,
P. N. GRISEZ.